US009205335B2

(12) United States Patent
McDonald et al.

(10) Patent No.: US 9,205,335 B2
(45) Date of Patent: Dec. 8, 2015

(54) ACHIEVEMENT REPLAY AND FRAUD DETECTION

(71) Applicant: Microsoft Corporation, Redmond, WA (US)

(72) Inventors: Cierra McDonald, Bothell, WA (US); Mike Horstmanshof, Shoreline, WA (US); Sela Davis, Seattle, WA (US); Craig Suthers, Seattle, WA (US); Cody Luitjens, Seattle, WA (US); Nick Koller, Seattle, WA (US); Doug Beck, Bothell, WA (US); Don Sprague, Seattle, WA (US); Michael Alyn Miller, Redlands, CA (US); Brian Jeans, Snoqualmie, WA (US); Carlos Carvallo, Sammamish, WA (US); Steve Dolan, Redmond, WA (US); Keith Kline, Bothell, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 13 days.

(21) Appl. No.: 14/021,334

(22) Filed: Sep. 9, 2013

(65) Prior Publication Data

US 2015/0072775 A1 Mar. 12, 2015

(51) Int. Cl.
*A63F 9/24* (2006.01)
*A63F 13/30* (2014.01)
*G07F 17/32* (2006.01)

(52) U.S. Cl.
CPC ............ *A63F 13/12* (2013.01); *G07F 17/3241* (2013.01)

(58) Field of Classification Search
CPC ............ G07F 17/3241; G07F 17/3239; G07F 17/3237; A63F 13/12
See application file for complete search history.

(56) References Cited

U.S. PATENT DOCUMENTS 7,517,282 B1 4/2009 Pryor
7,604,541 B2 10/2009 Aikin et al.
(Continued)

FOREIGN PATENT DOCUMENTS

EP 1609515 A1 12/2005

OTHER PUBLICATIONS

"International Search Report and Written Opinion Received for PCT Patent Application No. PCT/US2014/053965", Mailed Date: Nov. 26, 2014, 10 Pages.

*Primary Examiner* — Steve Rowland
(74) *Attorney, Agent, or Firm* — Aaron Chatterjee; Judy Yee; Micky Minhas

(57) ABSTRACT

Devices including gaming consoles, personal computers, tablets, smartphones, and the like may be configured with a client for capturing signals which are representative of user interactions with applications such as games. The captured signals are sent to a cloud-based service for archival storage. The service can subsequently replay the archived captured signals and compare them against known rules to determine if an achievement obtained by a user during interaction with the application was legitimately obtained in compliance with the rules or obtained improperly, for example by cheating or exploiting a bug in the application to falsely trigger the achievement. If the achievement is invalid, then the service can retroactively revoke the achievement. Alternatively, the service can replay the captured signals and detect instances in which an achievement was validly achieved but not properly acknowledged. The achievement can then be awarded or unlocked for the user retroactively.

19 Claims, 11 Drawing Sheets

(56) References Cited

U.S. PATENT DOCUMENTS

| | | | | |
|---|---|---|---|---|
| 2004/0053675 | A1 | 3/2004 | Nguyen et al. | |
| 2005/0029745 | A1 * | 2/2005 | Walker et al. | 273/292 |
| 2007/0218996 | A1 | 9/2007 | Harris et al. | |
| 2008/0070658 | A1 * | 3/2008 | Labgold et al. | 463/11 |
| 2008/0182660 | A1 * | 7/2008 | Fulton et al. | 463/29 |
| 2009/0113554 | A1 | 4/2009 | Zalewski | |
| 2009/0144415 | A1 | 6/2009 | Goglin et al. | |
| 2009/0144825 | A1 | 6/2009 | Schluessler et al. | |
| 2010/0222140 | A1 * | 9/2010 | Dewaal | 463/29 |
| 2012/0108327 | A1 * | 5/2012 | Tandon et al. | 463/29 |
| 2012/0150759 | A1 * | 6/2012 | Tarjan | 705/319 |
| 2012/0302354 | A1 | 11/2012 | Thakkar et al. | |
| 2012/0315993 | A1 | 12/2012 | Dumont et al. | |
| 2013/0005473 | A1 | 1/2013 | Bethke et al. | |
| 2013/0006736 | A1 | 1/2013 | Bethke et al. | |
| 2013/0111019 | A1 | 5/2013 | Tjew et al. | |
| 2013/0288785 | A1 * | 10/2013 | Arnone et al. | 463/25 |

* cited by examiner

ACHIEVEMENT REPLAY AND FRAUD DETECTION

BACKGROUND

Many games, applications, and platforms use an achievement framework or system to recognize and reward users for taking particular actions or completing goals. Achievements may include a reward or other type of incentive that motivates users to participate in the system. While many achievement systems perform satisfactorily in many cases, it may be possible that some users perform actions to cheat the system and obtain an achievement that is not justified. Alternatively, sometimes a user may miss receiving a valid achievement when the achievement system does not properly acknowledge that achievement criteria were legitimately met.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Devices including gaming consoles, personal computers, tablets, smartphones, and the like may be configured with a client for capturing signals which are representative of user interactions with applications such as games. The captured signals are sent to a cloud-based service for archival storage. The service can subsequently replay the archived captured signals and compare them against known rules to determine if an achievement obtained by a user during interaction with the application was legitimately obtained in compliance with the rules or obtained improperly, for example by cheating or exploiting a bug in the application to falsely trigger the achievement. If the achievement is invalid, then the service can retroactively revoke the achievement. Alternatively, the service can replay the captured signals and detect instances in which an achievement was validly achieved but not properly acknowledged. The achievement can then be awarded or unlocked for the user retroactively.

In various illustrative examples, the service can expose user-accessible tools using a web service to enable users to invoke a replay of captured signals for review and analysis. For example, a tool may be used to request a replay and analysis of captured signals when a user suspects another user may have cheated when obtaining or unlocking an achievement. Another tool may be used to request an achievement be unlocked if the player feels that the achievement criteria were validly met, but the achievement was not properly acknowledged during the course of the gameplay or a session of an application.

The ability to verify achievements and detect fraud using the cloud-based service outside the context of the application or game can be advantageous in many scenarios. Application user experience and gameplay for users of the devices in which the signal capture client is instantiated can be expected to be improved because users typically find that games and other applications in which cheating occurs to be less enjoyable. The ability to seek redress and correction of improperly awarded achievements and the failure of proper acknowledgment of legitimate awards may further appeal to the user's sense of fairness. In addition, the service may enable bugs, exploits, and other vulnerabilities to be more readily detected and corrected.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DESCRIPTION OF THE DRAWINGS

Like reference numerals indicate like elements in the drawings. Elements are not drawn to scale unless otherwise indicated.

DETAILED DESCRIPTION

Figure 1:
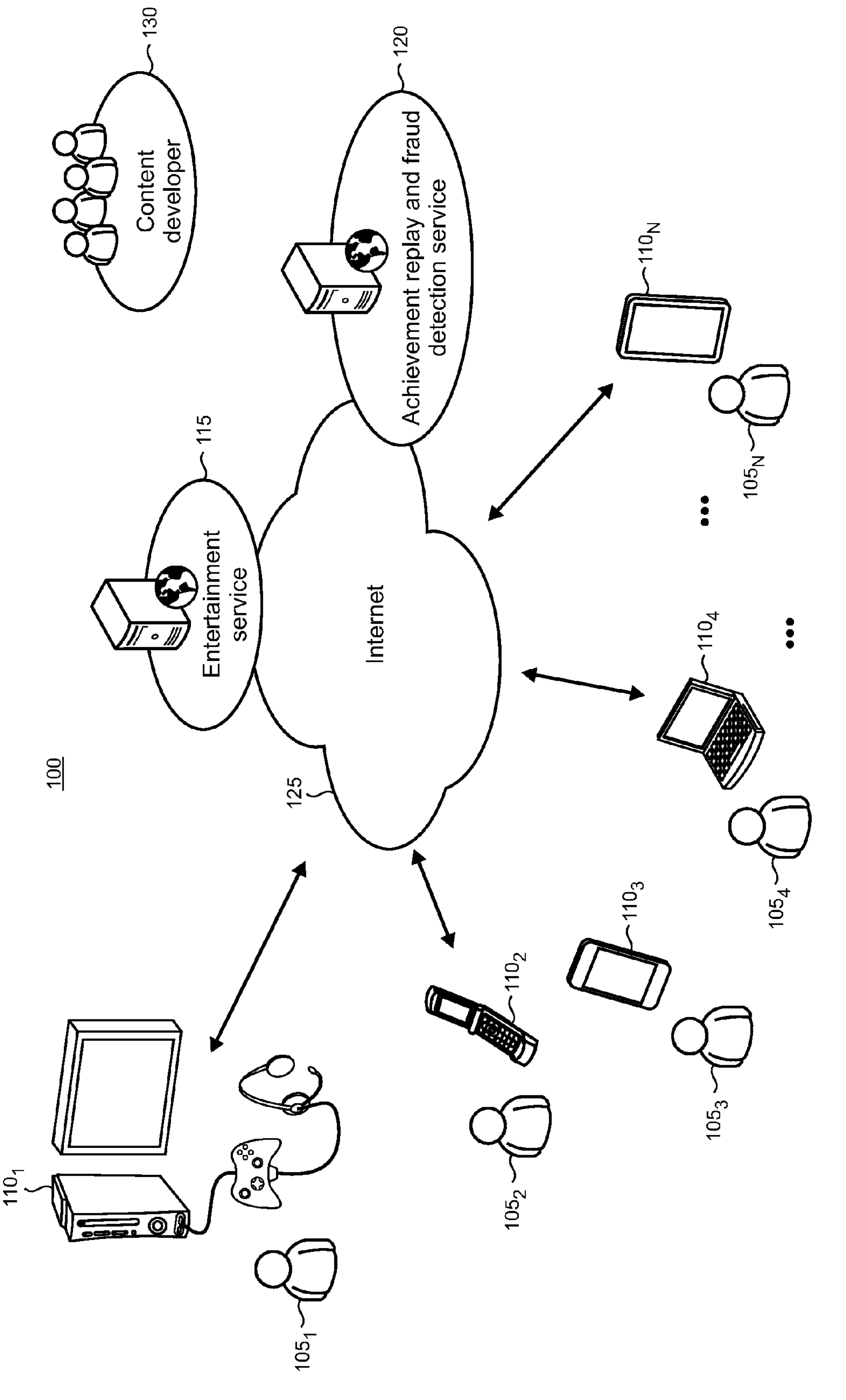
FIG. 1 shows an illustrative cloud-computing environment in which the present achievement replay and fraud detection may be implemented.

FIG. 1 shows an illustrative cloud-computing environment 100 in which the present achievement replay and fraud detection may be implemented. Users 105 of a variety of client devices 110 including multimedia consoles, mobile phones, smartphones, tablets, personal computers ("PCs"), personal digital assistants ("PDAs"), handheld gaming platforms, personal media players, wearable computers, navigation devices, and the like, which can consume and/or render media content may interact with an entertainment service 115 as well as an achievement replay and fraud detection service 120 over a network such as the Internet 125. In some implementations, the entertainment service 115 and the achievement replay and fraud detection service 120 may be combined into a common service. The achievement replay and fraud detection service 120 may also be incorporated into an achievement system or service in some cases. As shown in FIG. 1, a content developer 130 is also present in the environment 100.

Figure 2:
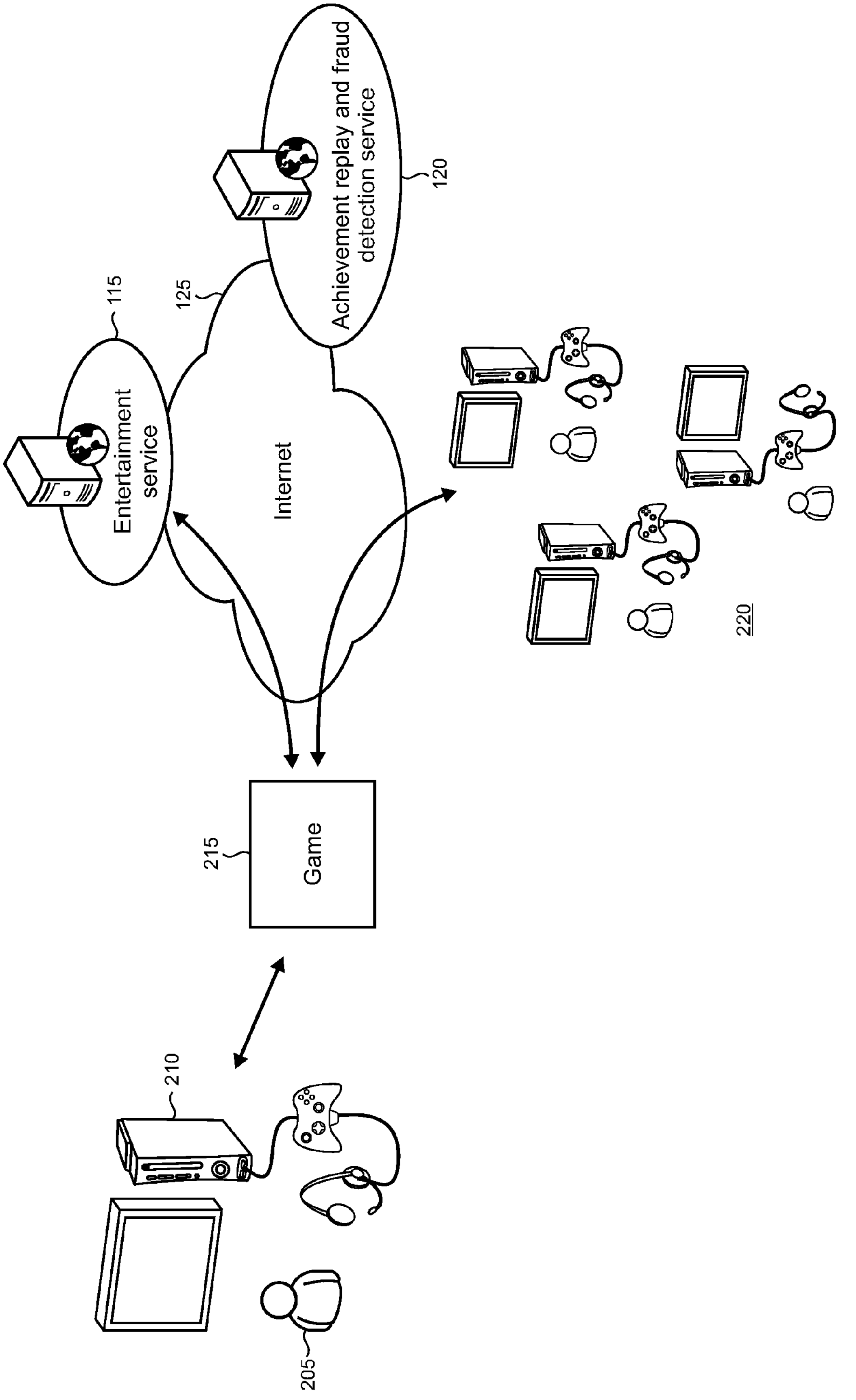
FIG. 2 shows a game that is played in the cloud-computing environment.
Figure 3:
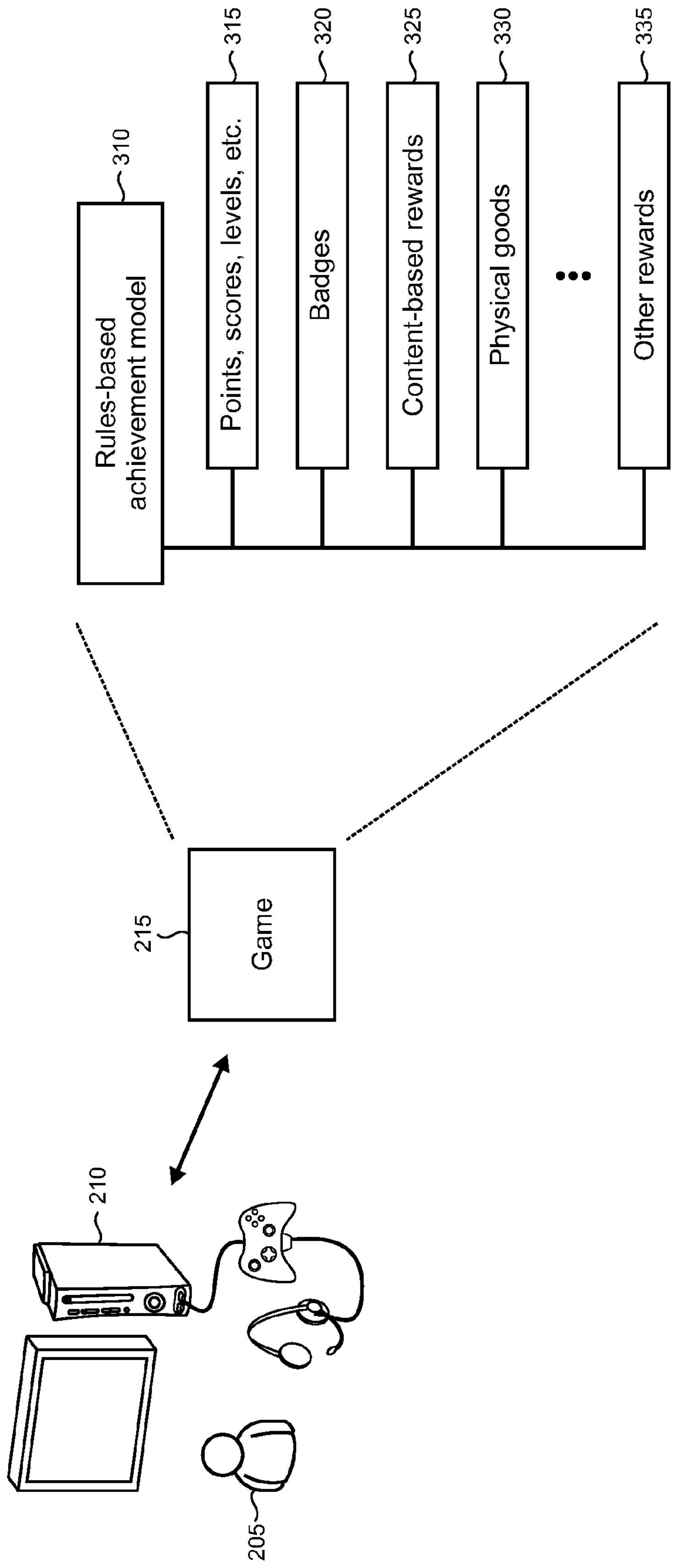
FIG. 3 shows a rules-based achievement model that is associated with a game.

In an illustrative example, as shown in FIG. 2, a user 205 of a multimedia console 210 plays a game 215. The game 215 may execute locally on the multimedia console, be hosted remotely by the entertainment service 115, or use a combination of local and remote execution in some cases. The game 215 may also be one in which multiple other players 220 can participate. As shown in FIG. 3, the game 215 may be associated with a rules-based achievement model 310. The achievement model may be incorporated into the gaming experience provided by the game 215 in some cases. In other cases, the achievement model 310 is implemented to add an extra dimension of interactivity and accomplishment that supplements the gameplay. In either case, the model 310 can provide various types of rewards to the game user 205 including points, scores, levels, and the like 315, badges 320, content-based rewards 325, physical goods 330, and other rewards 335 which may include various combinations of the above or other reward types. Illustrative examples of content-based rewards 325 may include unlocking digital artwork, obtaining new maps, unlocking new characters, and getting temporary or permanent powers, or a boost in gaming statistics. Illustrative examples of physical goods may include stickers and the like.

While the present illustrative example deals with a gaming scenario, achievement models can also be applied to non-gaming applications such as video and music applications. In such cases rewards could include, for example, sneak peek content, early access to content, subscription extensions, and the like.

Figure 4:
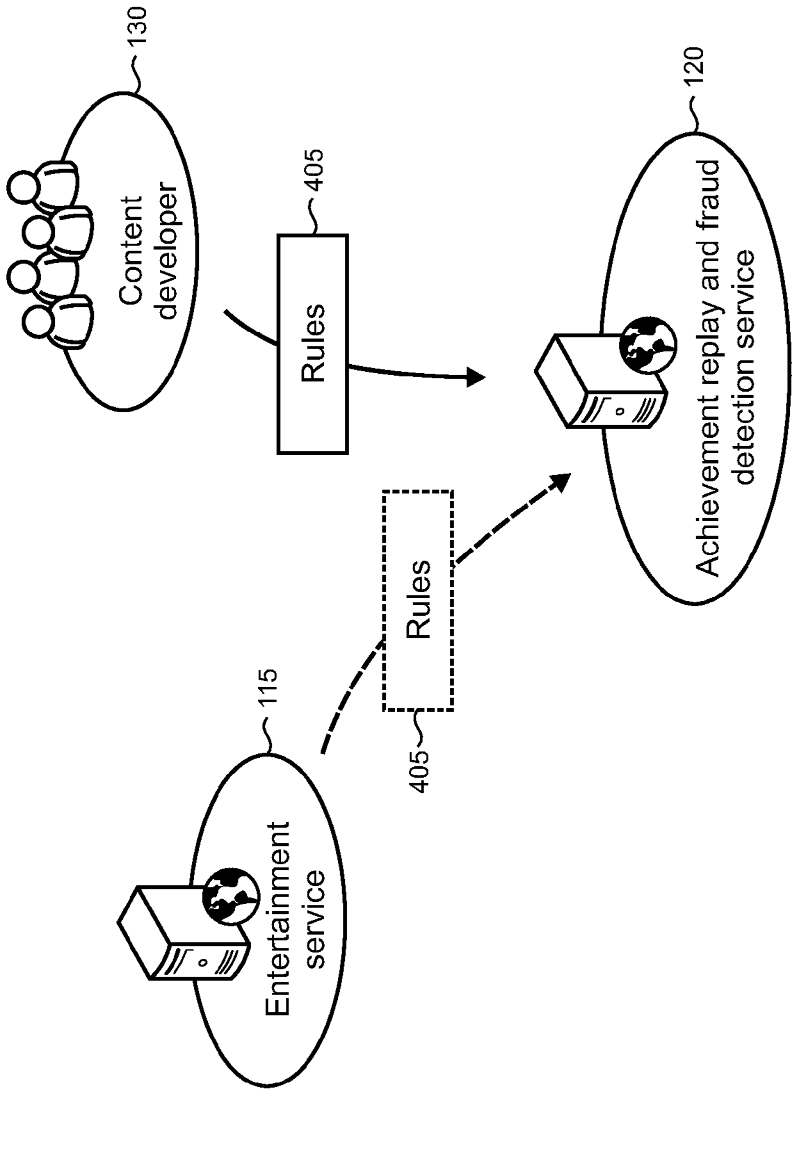
FIG. 4 shows rules being shared with an achievement replay and fraud detection service.

The rules-based achievement model 310 applies game-specific rules to determine a user's eligibility to receive a given reward based on a goal or one or more activities in which the user participates and/or accomplishes. Accordingly, as shown in FIG. 4, the content developer 130 (e.g., the author of the game), may typically provide rules 405 to the achievement replay and fraud detection [MH1]service[MKY2] 120. Alternatively, as indicated by the dashed line in FIG. 4, the entertainment service 115 may provide the rules 405 for a given game to the achievement replay and fraud service 120. In typical implementations, the users are also provided with the criteria for reaching an achievement that are expressed in the rules 405. For example, achievement criteria can be learned during the course of gameplay or through various user-accessible resources such as guides.

Figure 5:
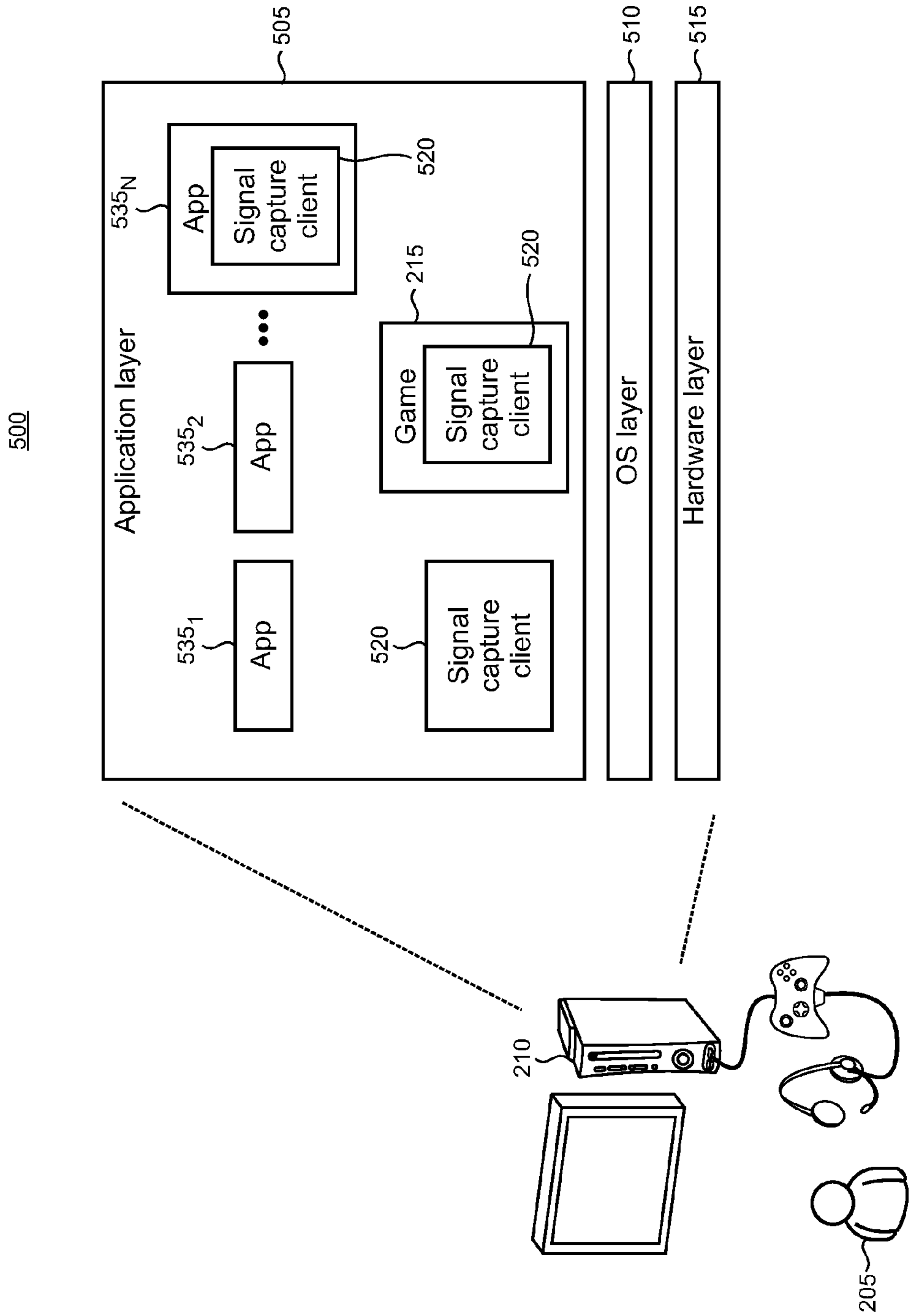
FIG. 5 shows an illustrative signal capture client that resides on a computing device such as a multimedia console.

FIG. 5 shows an illustrative architecture 500 of functional components that may be instantiated on a client device such as the multimedia console 210. The architecture 500 is typically implemented in software, although combinations of software, firmware, and/or hardware may also be utilized in some cases. The architecture 500 is arranged in layers and includes an application layer 505, an OS (operating system) layer 510, and a hardware layer 515. The hardware layer 515 provides an abstraction of the various hardware used by the device 110 (e.g., input and output devices, networking hardware, etc.) to the layers above it.

As shown in FIG. 5, the application layer 505 supports a variety of native applications $\mathbf{535}_{1, 2 \ldots N}$ that are generally implemented using locally executing code for the most part. In some cases, however, the native applications 535 may also rely on services and/or remote code execution provided by remote servers. The application layer 505, in this example, supports a signal capture client 520 that captures the signals that are generated during the user's interaction with the game 215 and sends them to the achievement replay and fraud detection service 120. The signals are typically implemented to be representative of a user's actions, inputs, behaviors, and the like during gameplay so that the interaction can be subsequently compared against the rules 405 (FIG. 4) to verify achievements.

The signal capture client 520 may be instantiated as a standalone component and/or be incorporated within an application 535 or the game 215 which also typically resides in the application layer 505. Alternatively, the signal capture client may be distributed across multiple components in the application layer 505. While the signal capture client 520 resides in the application layer 505 in this illustrative example, in alternative arrangements the signal capture client 520 may be incorporated in various components in the OS layer 510 or hardware layer 515, or its functionality distributed across two or more layers in the architecture 500. For a given game title, it would typically be expected that all the players of that game title would participate in signal capture and each client device would thus host a signal capture client 520 in order that the gameplay be consistent for all users with a rich and high quality user experience.

Figure 6:
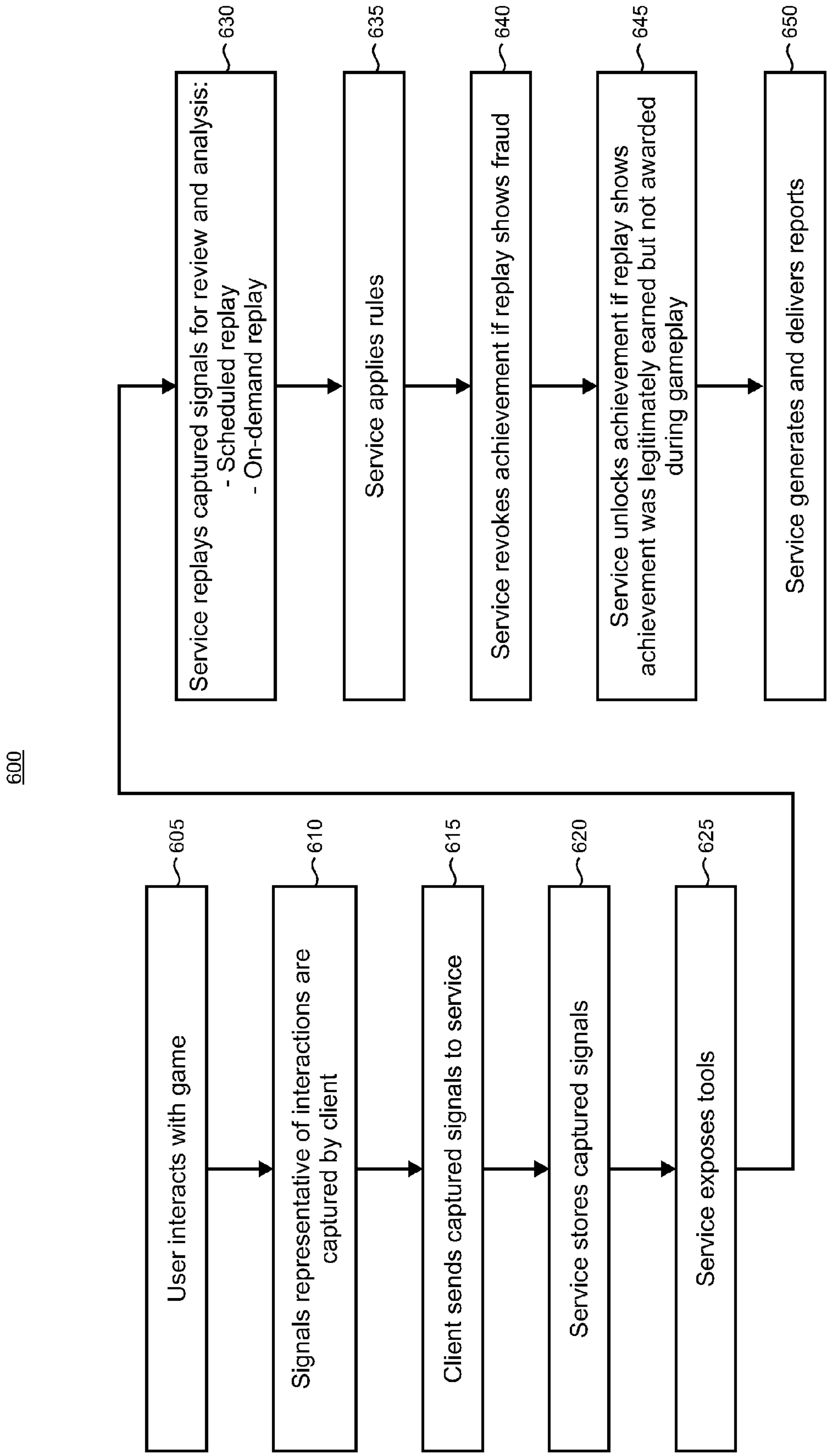
FIG. 6 is a flowchart of an illustrative method for achievement replay and fraud detection.
Figure 7:
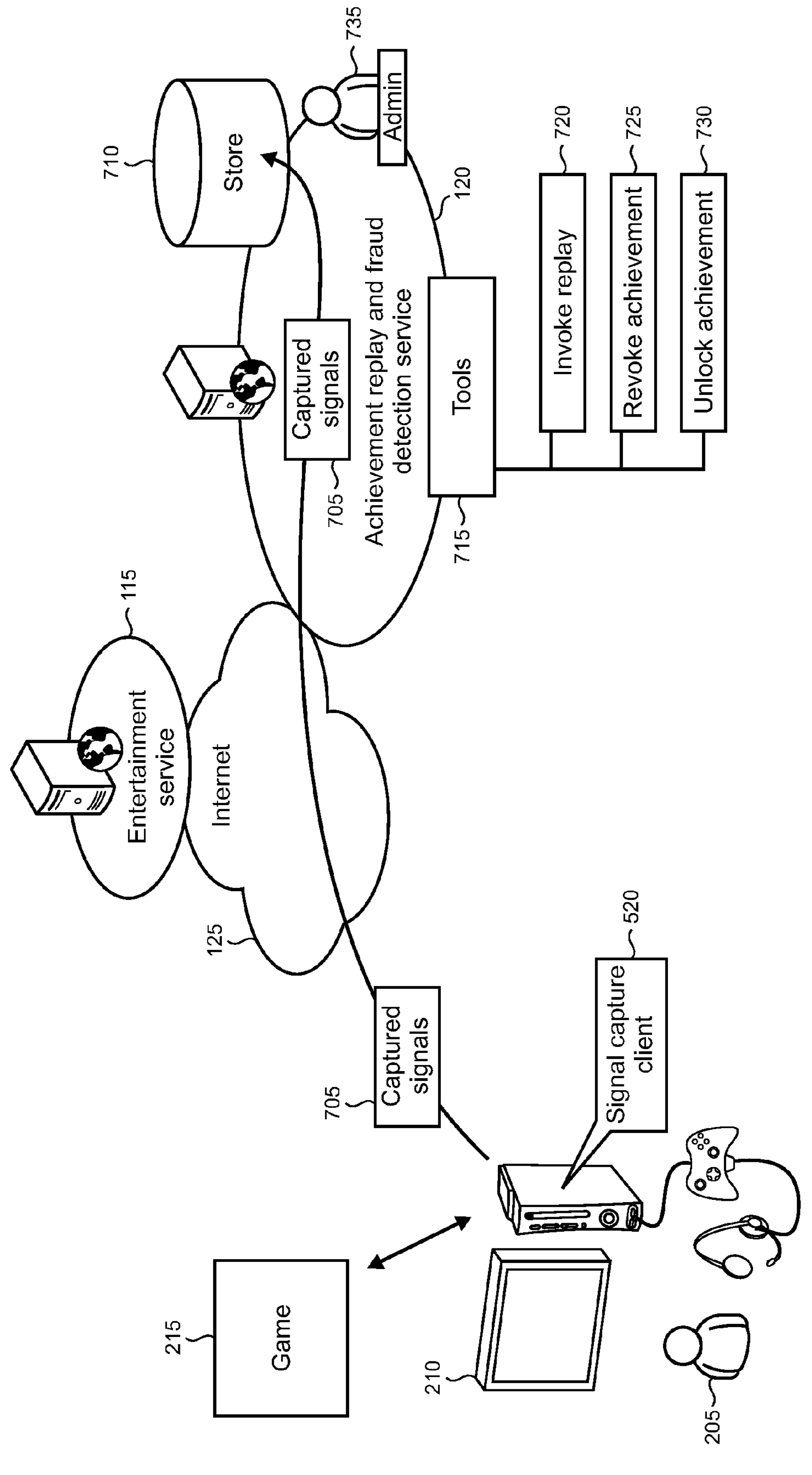
FIG. 7 shows an illustrative arrangement in which captured signals are sent to the achievement replay and fraud detection service which exposes various tools.

FIG. 6 is a flowchart of an illustrative method 600 for achievement replay and fraud detection. The reader may wish to refer to FIG. 7 as the discussion of method 600 is presented below. Unless specifically stated, the methods or steps shown in the flowchart and described below are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

At block 605 in FIG. 6, the user 205 interacts with the game [MH3]215[MKY4]. The signal capture client 520 running on the multimedia console 210 captures signals that are representative of the user's interactions with the game at block 610. At block 615, the signal capture client 520 sends the captured signals 705 to the achievement replay and fraud detection service 120 which archives the captured signals in a store 710, at block 620.

At block 625, the achievement replay and fraud detection service 120 exposes a variety of tools 715 including tools for invoking replay 720 of a portion or all of the captured signals 705, requesting a revocation of an achievement 725, and requesting an achievement be unlocked 730. It is emphasized that the tools 715 are illustrative and that other tools may also be implemented depending on the needs of a particular implementation of achievement replay and fraud detection. The tools 715 may be implemented as a web service, for example, so that users and/or other interested parties can access the achievement replay and fraud detection service 120 over the Internet 125. Thus, for example, a user may suspect that another game player has cheated and found a way to force the game to falsely trigger an achievement that was not otherwise legitimately obtained. In this case, the user can access the revoke achievement tool 725 and request that the other player's captured signals be replayed to verify the achievement which can then be retroactively revoked if determined to be fraudulently obtained.

At block 630, the achievement replay and fraud detection service 120 will replay the captured signals 705 and apply the rules 405 (FIG. 4), at block 635, to determine if criteria to obtain an achievement were properly met, or if the achievement was indeed obtained through illegitimate means such as cheating, exploiting a bug, or the like. In typical implementations, the achievement replay and fraud detection service will perform a review and analysis of captured signals in an automated manner without the need for intervention by a human operator. However, in some cases an administrator 735 may perform some amount of manual review, for example, if an unusual fact pattern emerges, or to ensure system performance and quality.

At block 640, the achievement replay and fraud detection service 120 can revoke the player's achievement retroactively if the review and analysis shows that the achievement was not legitimately obtained.

In addition to revoking fraudulently obtained achievement, the achievement replay and fraud detection service 120 can also award or unlock an achievement for a game player in cases where the achievement criteria were validly met, but for some reason the achievement was not awarded to the user in real-time during the course of the gameplay. In this case, the user may access the unlock achievement tool 730 and request that an achievement be unlocked. The achievement replay and fraud detection service 120 will replay the captured signals 705 and apply the rules 405 to determine if criteria to reach an achievement were properly met. If so, then at block 645, the achievement replay and fraud detection service 120 will unlock the achievement for the user retroactively.

In the illustrative examples above, the achievement replay and fraud detection service 120 performs review and analysis of captured signals "on-demand" in response to a request from a user though the tools 715 exposed by the service. In addition to on-demand actions, the achievement replay and fraud detection service 120 can replay captured signals for review and analysis on a scheduled basis. For example, the achievement replay and fraud detection service 120 may perform scheduled replays during audits for service quality assurance, for internal testing purposes, and for tracking overall user compliance/non-compliance with achievement eligibility criteria.

Figure 8:
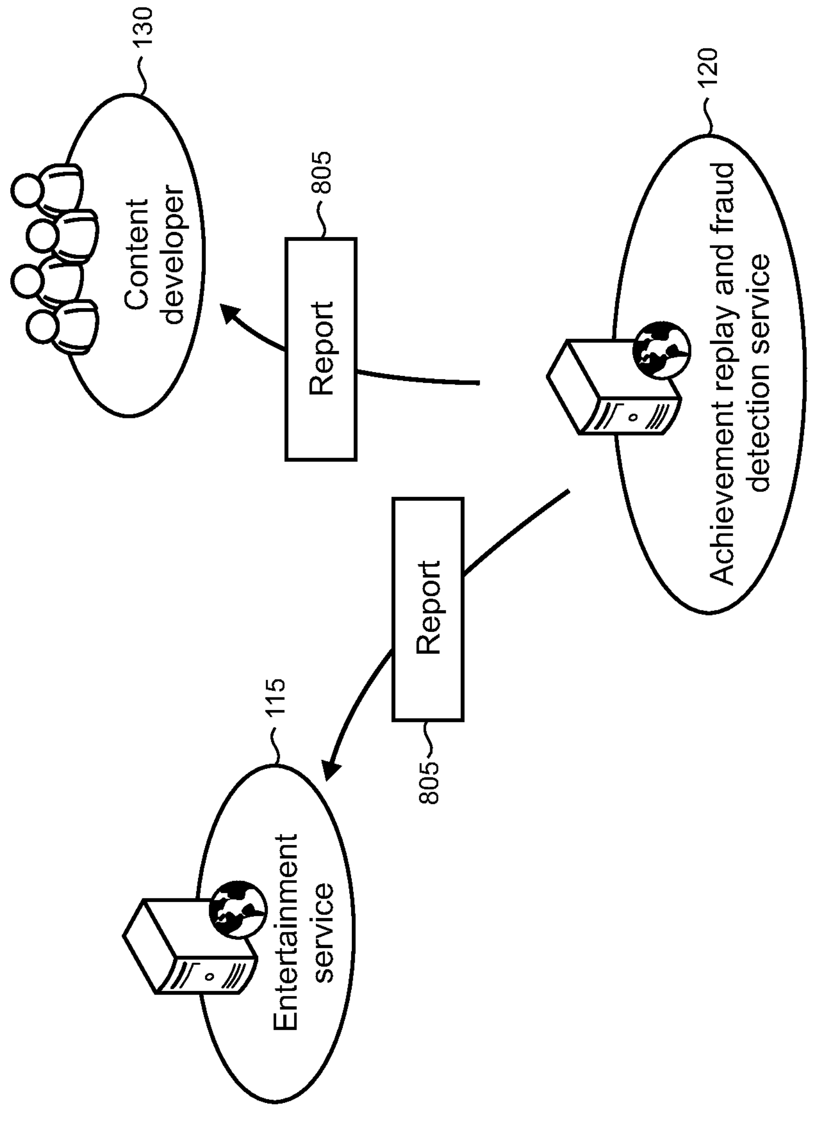
FIG. 8 shows an illustrative arrangement in which the achievement replay and fraud detection service generates and delivers reports.

At block 650, the achievement replay and fraud detection service 120 can generate and deliver various types of reports. For example, the reports may include statistical or other data that represents the number of users who sent signals indicating that achievements were illegitimately obtained or attempted to be obtained over some time interval and the trending of such fraudulent activities by game or application title. Similarly, the achievement replay and fraud detection service 120 may include data in the reports that represents the number of users who sent signals indicating that achievements were in fact legitimately obtained and should have been unlocked but were not during the course of gameplay, and the trending of such activities by game or application title. As shown in FIG. 8, the achievement replay and fraud detection service 120 may transmit reports 805 to one or both of the entertainment service 115 and content developer 130.

Figure 9:
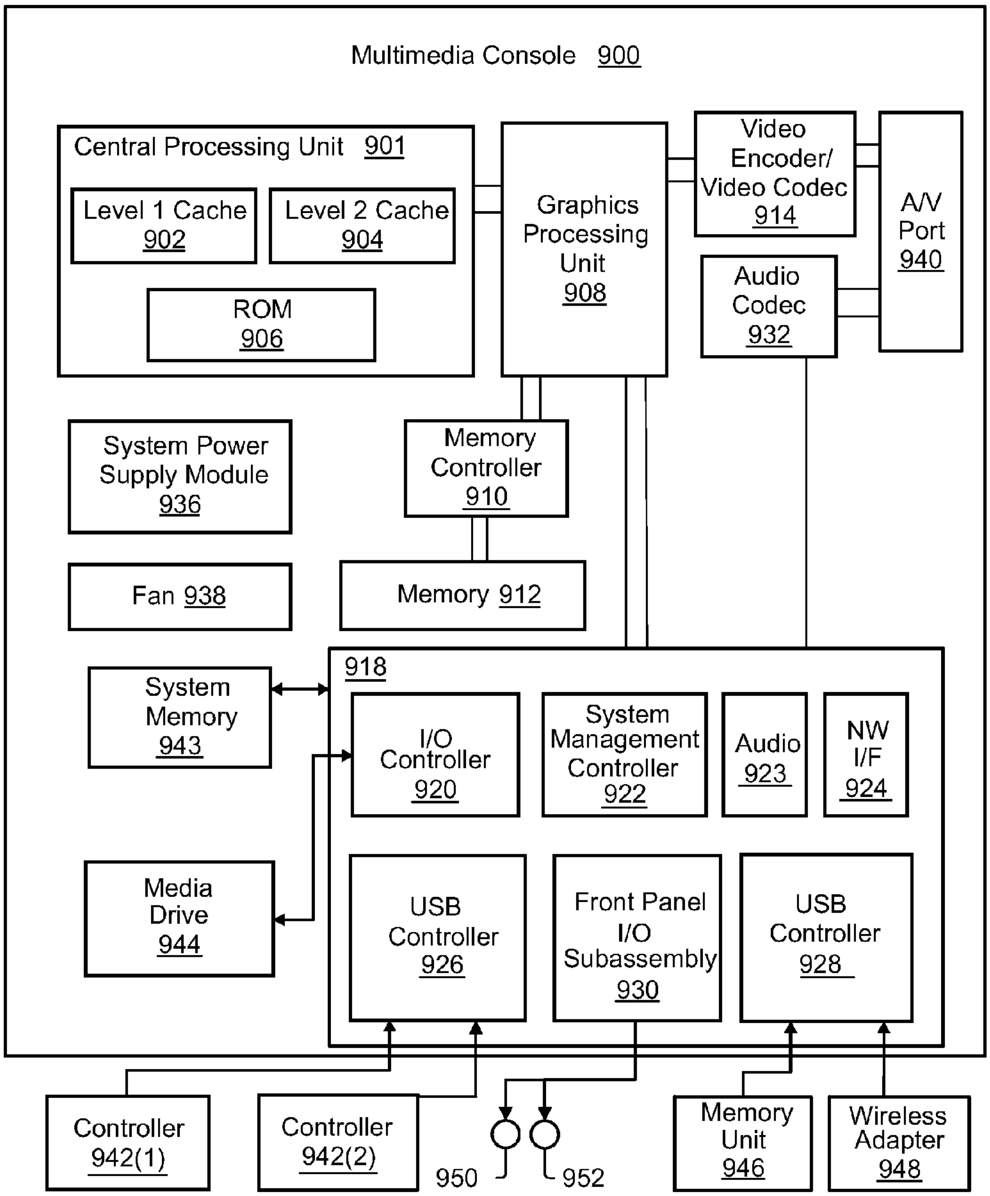
FIG. 9 is an illustrative functional block diagram of a multimedia console.

FIG. 9 is an illustrative functional block diagram of the multimedia console 210 shown in FIGS. 2, 3, 5, and 7. As shown in FIG. 9, the multimedia console 210 has a central processing unit (CPU) 901 having a level 1 cache 902, a level 2 cache 904, and a Flash ROM (Read Only Memory) 906. The level 1 cache 902 and the level 2 cache 904 temporarily store data and hence reduce the number of memory access cycles, thereby improving processing speed and throughput. The CPU 901 may be configured with more than one core, and thus, additional level 1 and level 2 caches 902 and 904. The Flash ROM 906 may store executable code that is loaded during an initial phase of a boot process when the multimedia console 210 is powered ON.

A graphics processing unit (GPU) 908 and a video encoder/video codec (coder/decoder) 914 form a video processing pipeline for high speed and high resolution graphics processing. Data is carried from the GPU 908 to the video encoder/video codec 914 via a bus. The video processing pipeline outputs data to an A/V (audio/video) port 940 for transmission to a television or other display. A memory controller 910 is connected to the GPU 908 to facilitate processor access to various types of memory 912, such as, but not limited to, a RAM.

The multimedia console 210 includes an I/O controller 920, a system management controller 922, an audio processing unit 923, a network interface controller 924, a first USB (Universal Serial Bus) host controller 926, a second USB controller 928, and a front panel I/O subassembly 930 that are preferably implemented on a module 918. The USB controllers 926 and 928 serve as hosts for peripheral controllers 942(1)-942(2), a wireless adapter 948, and an external memory device 946 (e.g., Flash memory, external CD/DVD ROM drive, removable media, etc.). The network interface controller 924 and/or wireless adapter 948 provide access to a network (e.g., the Internet, home network, etc.) and may be any of a wide variety of various wired or wireless adapter components including an Ethernet card, a modem, a Bluetooth module, a cable modem, or the like.

System memory 943 is provided to store application data that is loaded during the boot process. A media drive 944 is provided and may comprise a DVD/CD drive, hard drive, or other removable media drive, etc. The media drive 944 may be internal or external to the multimedia console 210. Application data may be accessed via the media drive 944 for execution, playback, etc. by the multimedia console 210. The media drive 944 is connected to the I/O controller 920 via a bus, such as a Serial ATA bus or other high speed connection (e.g., IEEE 1394).

The system management controller 922 provides a variety of service functions related to assuring availability of the multimedia console 210. The audio processing unit 923 and an audio codec 932 form a corresponding audio processing pipeline with high fidelity and stereo processing. Audio data is carried between the audio processing unit 923 and the audio codec 932 via a communication link. The audio processing pipeline outputs data to the A/V port 940 for reproduction by an external audio player or device having audio capabilities.

The front panel I/O subassembly 930 supports the functionality of the power button 950 and the eject button 952, as well as any LEDs (light emitting diodes) or other indicators exposed on the outer surface of the multimedia console 210. A system power supply module 936 provides power to the components of the multimedia console 210. A fan 938 cools the circuitry within the multimedia console 210.

The CPU 901, GPU 908, memory controller 910, and various other components within the multimedia console 210 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 210 is powered ON, application data may be loaded from the system memory 943 into memory 912 and/or caches 902 and 904 and executed on the CPU 901. The application may present a graphical user interface that provides a consistent user experience when navigating to different media types available on the multimedia console 210. In operation, applications and/or other media contained within the media drive 944 may be launched or played from the media drive 944 to provide additional functionalities to the multimedia console 210.

The multimedia console 210 may be operated as a standalone system by simply connecting the system to a television or other display. In this standalone mode, the multimedia console 210 allows one or more users to interact with the system, watch movies, or listen to music. However, with the integration of broadband connectivity made available through the network interface controller 924 or the wireless adapter 948, the multimedia console 210 may further be operated as a participant in a larger network community.

When the multimedia console 210 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications, and drivers. The CPU reservation is preferably constant such that if the reserved CPU usage is not used by the system applications, an idle thread will consume any unused cycles.

With regard to the GPU reservation, lightweight messages generated by the system applications (e.g., pop-ups) are displayed by using a GPU interrupt to schedule code to render pop-ups into an overlay. The amount of memory needed for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV re-sync is eliminated.

After the multimedia console 210 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 901 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 942(1) and 942(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches.

Figure 10:
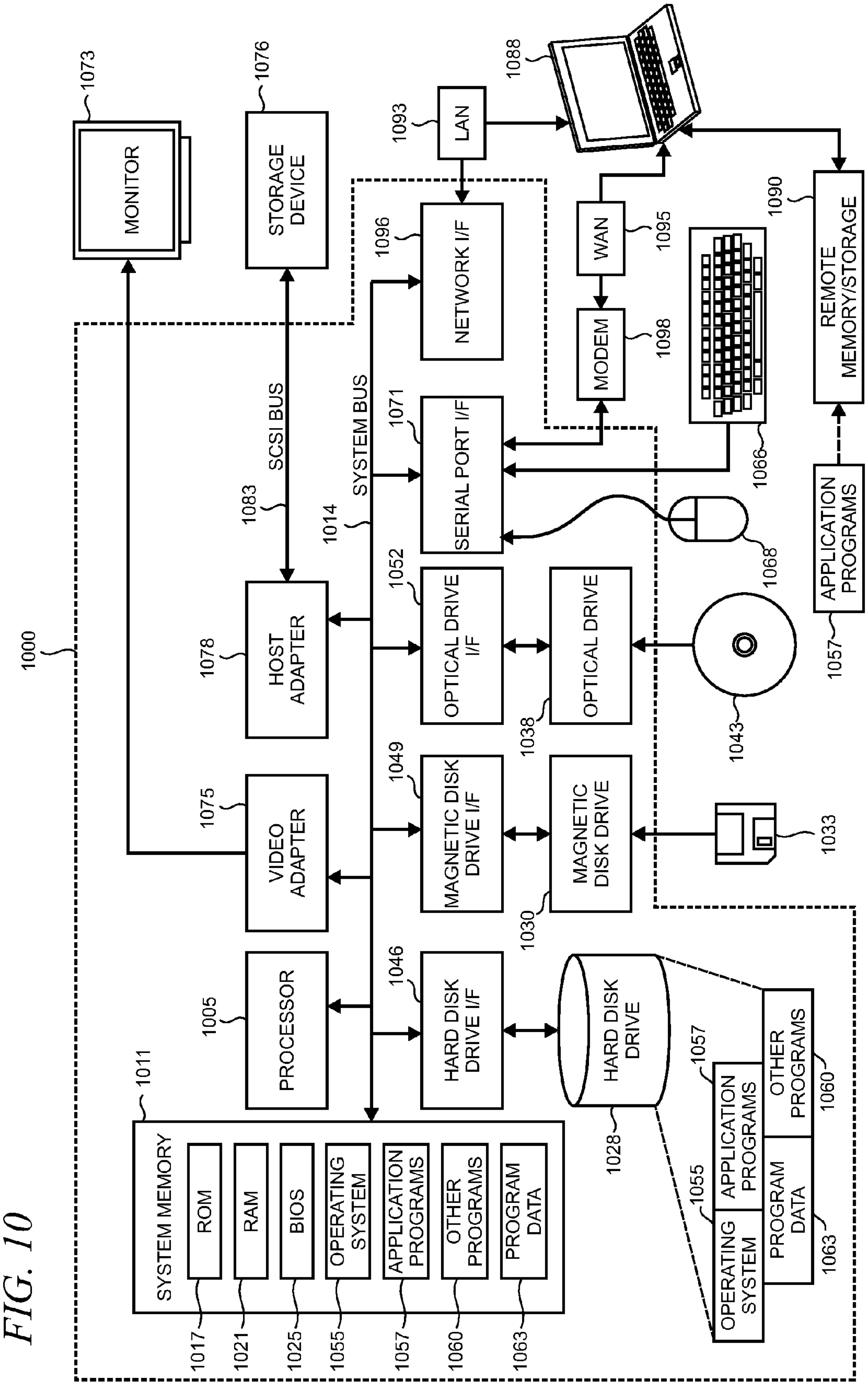
FIG. 10 is a simplified block diagram of an illustrative computer system such as a personal computer ("PC") that may be used in part to implement the present achievement replay and fraud detection.

FIG. 10 is a simplified block diagram of an illustrative computer system 1000 such as a PC, client device, or server with which the present achievement replay and fraud detection may be implemented. Computer system 1000 includes a processing unit 1005, a system memory 1011, and a system bus 1014 that couples various system components including the system memory 1011 to the processing unit 1005. The system bus 1014 may be any of several types of bus structures including a memory bus or memory controller, a peripheral bus, and a local bus using any of a variety of bus architectures. The system memory 1011 includes read only memory ("ROM") 1017 and random access memory ("RAM") 1021. A basic input/output system ("BIOS") 1025, containing the basic routines that help to transfer information between elements within the computer system 1000, such as during startup, is stored in ROM 1017. The computer system 1000 may further include a hard disk drive 1028 for reading from and writing to an internally disposed hard disk (not shown), a magnetic disk drive 1030 for reading from or writing to a removable magnetic disk 1033 (e.g., a floppy disk), and an optical disk drive 1038 for reading from or writing to a removable optical disk 1043 such as a CD (compact disc), DVD (digital versatile disc), or other optical media. The hard disk drive 1028, magnetic disk drive 1030, and optical disk drive 1038 are connected to the system bus 1014 by a hard disk drive interface 1046, a magnetic disk drive interface 1049, and an optical drive interface 1052, respectively. The drives and their associated computer readable storage media provide non-volatile storage of computer readable instructions, data structures, program modules, and other data for the computer system 1000. Although this illustrative example shows a hard disk, a removable magnetic disk 1033, and a removable optical disk 1043, other types of computer readable storage media which can store data that is accessible by a computer such as magnetic cassettes, flash memory cards, digital video disks, data cartridges, random access memories ("RAMs"), read only memories ("ROMs"), and the like may also be used in some applications of the present achievement replay and fraud detection. In addition, as used herein, the term computer readable storage medium includes one or more instances of a media type (e.g., one or more magnetic disks, one or more CDs, etc.). For purposes of this specification and the claims, the phrase "computer-readable storage media" and variations thereof, does not include waves, signals, and/or other transitory and/or intangible communication media.

A number of program modules may be stored on the hard disk, magnetic disk 1033, optical disk 1043, ROM 1017, or RAM 1021, including an operating system 1055, one or more application programs 1057, other program modules 1060, and program data 1063. A user may enter commands and information into the computer system 1000 through input devices such as a keyboard 1066 and pointing device 1068 such as a mouse. Other input devices (not shown) may include a microphone, joystick, game pad, satellite dish, scanner, trackball, touchpad, touch screen, touch-sensitive module or device, gesture-recognition module or device, voice recognition module or device, voice command module or device, or the like. These and other input devices are often connected to the processing unit 1005 through a serial port interface 1071 that is coupled to the system bus 1014, but may be connected by other interfaces, such as a parallel port, game port, or USB. A monitor 1073 or other type of display device is also connected to the system bus 1014 via an interface, such as a video adapter 1075. In addition to the monitor 1073, personal computers typically include other peripheral output devices (not shown), such as speakers and printers. The illustrative example shown in FIG. 10 also includes a host adapter 1078, a Small Computer System Interface ("SCSI") bus 1083, and an external storage device 1076 connected to the SCSI bus 1083.

The computer system 1000 is operable in a networked environment using logical connections to one or more remote computers, such as a remote computer 1088. The remote computer 1088 may be selected as another personal computer, a server, a router, a network PC, a peer device, or other common network node, and typically includes many or all of the elements described above relative to the computer system 1000, although only a single representative remote memory/storage device 1090 is shown in FIG. 10. The logical connections depicted in FIG. 10 include a local area network ("LAN") 1093 and a wide area network ("WAN") 1095. Such networking environments are often deployed, for example, in offices, enterprise-wide computer networks, intranets, and the Internet.

When used in a LAN networking environment, the computer system 1000 is connected to the local area network 1093 through a network interface or adapter 1096. When used in a WAN networking environment, the computer system 1000 typically includes a broadband modem 1098, network gateway, or other means for establishing communications over the wide area network 1095, such as the Internet. The broadband modem 1098, which may be internal or external, is connected to the system bus 1014 via a serial port interface 1071. In a networked environment, program modules related to the computer system 1000, or portions thereof, may be stored in the remote memory storage device 1090. It is noted that the network connections shown in FIG. 10 are illustrative and other means of establishing a communications link between the computers may be used depending on the specific requirements of an application of achievement replay and fraud detection.

Figure 11:
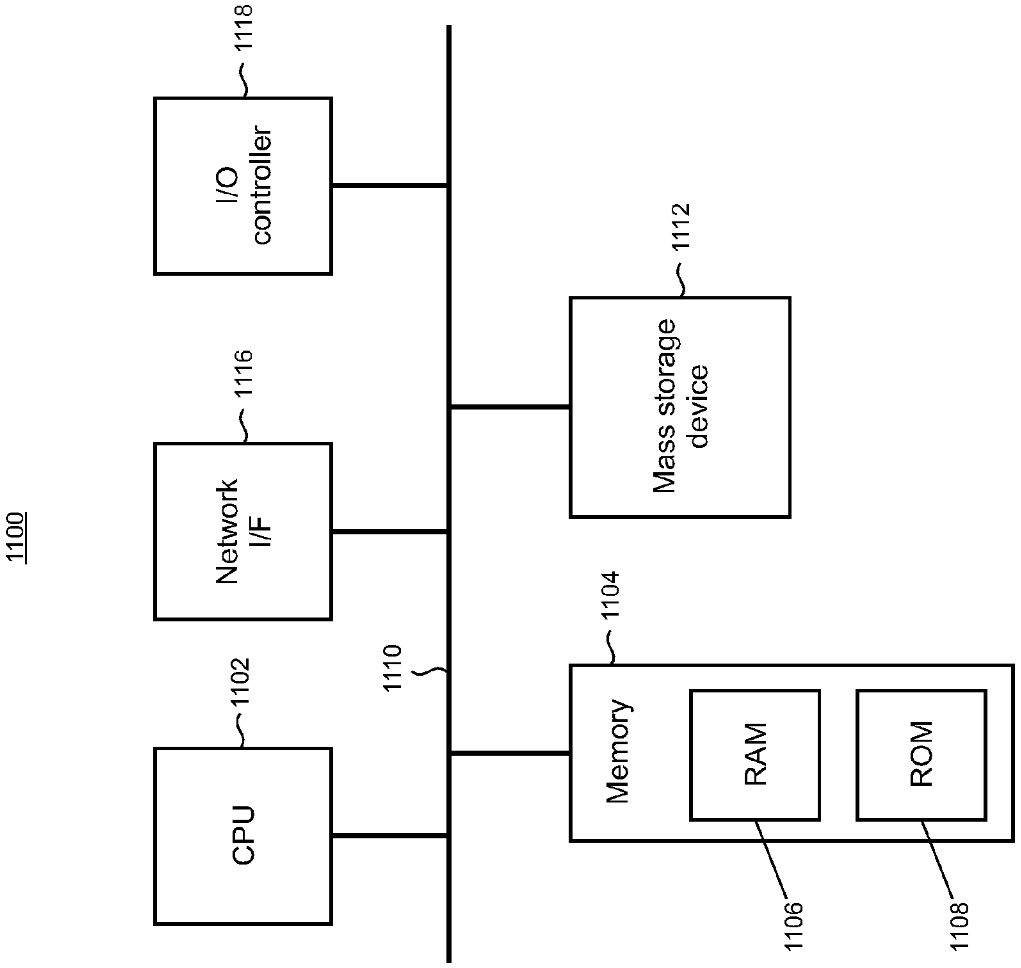
FIG. 11 shows a block diagram of an illustrative computing platform that may be used in part to implement the present achievement replay and fraud detection.

It may be desirable and/or advantageous to enable other types of computing platforms other than the multimedia console 210 to implement the present achievement replay and fraud detection in some applications. For example, a game and signal capture client may be readily adapted to run on various fixed computing platforms and mobile computing platforms. FIG. 11 shows an illustrative architecture 1100 for a computing platform or device capable of executing the various components described herein for providing achievement replay and fraud detection. Thus, the architecture 1100 illustrated in FIG. 11 shows an architecture that may be adapted for a server computer, mobile phone, a PDA (personal digital assistant), a smartphone, a desktop computer, a netbook computer, a tablet computer, GPS (Global Positioning System) device, gaming console, and/or a laptop computer. The architecture 1100 may be utilized to execute any aspect of the components presented herein.

The architecture 1100 illustrated in FIG. 11 includes a CPU 1102, a system memory 1104, including a RAM 1106 and a ROM 1108, and a system bus 1110 that couples the memory 1104 to the CPU 1102. A basic input/output system containing the basic routines that help to transfer information between elements within the architecture 1100, such as during startup, is stored in the ROM 1108. The architecture 1100 further includes a mass storage device 1112 for storing software code or other computer-executed code that is utilized to implement applications, the file system, and the operating system.

The mass storage device 1112 is connected to the CPU 1102 through a mass storage controller (not shown) connected to the bus 1110. The mass storage device 1112 and its associated computer-readable storage media provide non-volatile storage for the architecture 1100. Although the description of computer-readable storage media contained herein refers to a mass storage device, such as a hard disk or CD-ROM drive, it should be appreciated by those skilled in the art that computer-readable media can be any available computer storage media that can be accessed by the architecture 1100.

By way of example, and not limitation, computer-readable storage media may include volatile and non-volatile, removable and non-removable media implemented in any method or technology for storage of information such as computer-readable instructions, data structures, program modules or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), BLU-RAY, or other optical storage, magnetic cassettes, magnetic tape, magnetic disk storage or other magnetic storage devices, or any other medium which can be used to store the desired information and which can be accessed by the architecture 1100.

According to various embodiments, the architecture 1100 may operate in a networked environment using logical connections to remote computers through a network. The architecture 1100 may connect to the network through a network interface unit 1116 connected to the bus 1110. It should be appreciated that the network interface unit 1116 also may be utilized to connect to other types of networks and remote computer systems. The architecture 1100 also may include an input/output controller 1118 for receiving and processing input from a number of other devices, including a keyboard, mouse, or electronic stylus (not shown in FIG. 11). Similarly, the input/output controller 1118 may provide output to a display screen, a printer, or other type of output device (also not shown in FIG. 11).

It should be appreciated that the software components described herein may, when loaded into the CPU 1102 and executed, transform the CPU 1102 and the overall architecture 1100 from a general-purpose computing system into a special-purpose computing system customized to facilitate the functionality presented herein. The CPU 1102 may be constructed from any number of transistors or other discrete circuit elements, which may individually or collectively assume any number of states. More specifically, the CPU 1102 may operate as a finite-state machine, in response to executable instructions contained within the software modules disclosed herein. These computer-executable instructions may transform the CPU 1102 by specifying how the CPU 1102 transitions between states, thereby transforming the transistors or other discrete hardware elements constituting the CPU 1102.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the architecture 1100 in order to store and execute the software components presented herein. It also should be appreciated that the architecture 1100 may include other types of computing devices, including hand-held computers, embedded computer systems, smartphones, PDAs, and other types of computing devices known to those skilled in the art. It is also contemplated that the architecture 1100 may not include all of the components shown in FIG. 11, may include other components that are not explicitly shown in FIG. 11, or may utilize an architecture completely different from that shown in FIG. 11.

Based on the foregoing, it should be appreciated that technologies for achievement replay and fraud detection have been disclosed herein. Although the subject matter presented herein has been described in language specific to computer structural features, methodological and transformative acts, specific computing machinery, and computer readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed:

1. A method performed by a server for improving security for interactions between the server and a local client device when connected by a network by verifying achievements awardable to a user of the local client device on which a session of an application is executable, the method comprising the steps of:

- receiving, over the network, signals representative of the user's interactions with the application, the received signals being captured at the local client device during execution of the application session;
- replaying the captured signals subsequent to their capture at the local client device;
- comparing the captured signals against one or more rules, the rules expressing achievement criteria by which an achievement is awardable to the user and wherein the rules are set by an author of the application;
- responsively to the comparing, retroactively revoking an achievement awarded to the user that is determined to be in violation of the one or more rules; and
- responsively to the comparing, retroactively awarding an achievement for which the user is eligible in compliance with the one or more rules but was not awarded during the course of the application session.

2. The method of claim 1 further comprising archiving the captured signals in a store.

3. The method of claim 1 further including exposing user-accessible tools for invoking replay of the captured signals.

4. The method of claim 3 in which the tools include a tool to request revoking an achievement.

5. The method of claim 3 in which the tools include a tool to request unlocking an achievement.

6. The method of claim 3 in which the tools are implemented using a web service.

7. The method of claim 1 further comprising generating a report that includes statistical data that identifies instances in which application users obtained achievements in violation of the one or more rules, instances in which application users attempted to obtain achievements in violation of the one or more rules, or instances in which application users earned achievements in compliance with the one or more rules but the achievements were not acknowledged.

8. The method of claim 1 in which the application comprises a game.

9. The method of claim 1 in which the achievement is associated with a reward including at least one of points, score, level, badge, content-based reward, or physical good.

10. The method of claim 9 in which the content-based reward includes at least one of unlocked digital artwork, new map, unlocked new character, temporary power, temporary ability, permanent power, permanent ability, game statistic boost, sneak peak content, early access to content, or subscription extension.

11. The method of claim 1 further comprising implementing the steps of receiving, replaying, comparing, retroactively revoking, and retroactively awarding using an achievement system.

12. The method of claim 11 in which the achievement system is implemented as a portion of an entertainment service.

13. A local client device that is connectable to a service executing on a remote server over a network for verifying achievements to improve security on the local client device, comprising:

- at least one processor; and
- memory operatively coupled to the processor and storing computer-readable instructions that, when executed by the at least one processor, implement a signal capture client that performs a method comprising the steps of:
  - capturing signals representative of a user's interactions with an application, the signals being captured by the signal capture client during execution of the application on the local client device, and
  - transmitting the captured signals over the network to the service running on a remote server, the service comparing the captured signals against one or more rules that are set by an author of the application, the rules expressing achievement criteria by which an achievement is awardable, the service being configured for retroactively revoking an achievement awarded to the user that is determined to be in violation of the one or more rules, and being further configured for retroactively awarding an achievement for which the user was eligible in compliance with the one or more rules but was not awarded during the course of execution of the application.

14. The local client device of claim 13 in which the processor and memory are incorporated into a device being one of multimedia console, mobile phone, smartphone, tablet, personal computer ("PC"), personal digital assistant ("PDA"), handheld gaming platform, personal media player, wearable computer, or navigation device.

15. The local client device of claim 13 in which the signal capture client is instantiated in the application.

16. The local client device of claim 13 in which the signal capture client is instantiated in either an operating system executing on the local client device or in an application layer executing on the local client device.

17. One or more computer-readable storage media containing instructions which, when executed by one or more processors disposed in an remote server, perform a method for detecting fraudulently obtained achievements by a user of an application executing on a local client device that is in communication with the remote server over a network, the method comprising the steps of:

receiving rules that express eligibility criteria for unlocking an achievement obtained during a course of application execution;

receiving, over the network, signals representative of the user's interactions with the application;

replaying the captured signals subsequent to their capture at the local client device;

comparing the captured signals against the one or more rules to determine the user's compliance with the rules or violation of the rules wherein the rules are set by an author of the application;

retroactively revoking an achievement awarded to the user that is determined to be in violation of the rules; and retroactively awarding an achievement for which the user was eligible in compliance with the rules but was not acknowledged during the execution of the application.

18. The one or more computer-readable storage media of claim 17 in which the method further includes a step of performing the steps of replaying, comparing, retroactively revoking, and retroactively awarding according to a schedule.

19. The one or more computer-readable storage media of claim 18 in which the method further includes a step of performing the steps of replaying, comparing, retroactively revoking, and retroactively awarding on-demand.

* * * * *